US012785489B2

(12) United States Patent
Hummel et al.

(10) Patent No.: US 12,785,489 B2
(45) Date of Patent: Nov. 3, 2026

(54) ELECTRIC MOTOR

(71) Applicant: BorgWarner Inc., Auburn Hills, MI (US)

(72) Inventors: Benedikt Hummel, Zweibrücken (DE); Silvio Koch, Kirchheimbolanden (DE); Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 208 days.

(21) Appl. No.: 18/771,635

(22) Filed: Jul. 12, 2024

(65) Prior Publication Data

US 2025/0030304 A1 Jan. 23, 2025

(30) Foreign Application Priority Data

Jul. 21, 2023 (DE) ..................... 10 2023 119 360.0

(51) Int. Cl.

| | |
|---|---|
| ***H02K 1/20*** | (2006.01) |
| ***H02K 5/18*** | (2006.01) |
| ***H02K 5/20*** | (2006.01) |
| ***H02K 9/19*** | (2006.01) |
| ***H02K 9/193*** | (2006.01) |
| ***H02K 11/33*** | (2016.01) |
| ***H02K 21/22*** | (2006.01) |

(52) U.S. Cl.

CPC ............... *H02K 5/203* (2021.01); *H02K 5/18* (2013.01); *H02K 9/19* (2013.01); *H02K 21/22* (2013.01)

(58) Field of Classification Search

CPC ............ H02K 5/18; H02K 5/20; H02K 5/203; H02K 9/19; H02K 9/00; H02K 9/22; H02K 9/193; H02K 11/33; H02K 21/22; H02K 1/20

See application file for complete search history.

(56) References Cited

U.S. PATENT DOCUMENTS

| | | | | |
|---|---|---|---|---|
| 10,270,315 B2 | | 4/2019 | Desbiens et al. | |
| 11,979,075 B2 | * | 5/2024 | Mohamed | H02K 5/20 |
| 12,218,555 B2 | * | 2/2025 | Kang | H02K 5/161 |
| 12,249,892 B2 | * | 3/2025 | Khan | H02K 5/203 |

(Continued)

FOREIGN PATENT DOCUMENTS

| | | | | |
|---|---|---|---|---|
| CN | 203617798 U | * | 5/2014 | |
| CN | 107017715 A | * | 8/2017 | H02K 1/22 |

(Continued)

*Primary Examiner* — Edgardo San Martin

(74) *Attorney, Agent, or Firm* — Bose McKinney & Evans LLP

(57) ABSTRACT

An electric motor has a stator, a rotor surrounding the stator, a shaft connected to the rotor in a rotationally fixed manner, and a housing. The housing has first and second housing components, which together enclose a motor compartment in which are arranged the stator and the rotor. A cooling channel extends in an interior space surrounded by the stator. A first end of the shaft is arranged in the motor compartment and a second end of the shaft protrudes from the housing. The first housing component has an inner part which protrudes into the stator. In accordance with this disclosure, it is envisaged that an insert is arranged in the interior space surrounded by the stator, which insert, together with the inner part of the first housing component, defines at least one section of the cooling channel.

13 Claims, 4 Drawing Sheets

(56) References Cited

U.S. PATENT DOCUMENTS

| | | | | |
|---|---|---|---|---|
| 2004/0012272 | A1 | 1/2004 | Houle et al. | |
| 2017/0070106 | A1 | 3/2017 | Guo et al. | |
| 2025/0030301 | A1* | 1/2025 | Hummel | H02K 11/30 |
| 2025/0030302 | A1* | 1/2025 | Koch | H02K 5/1735 |
| 2025/0030303 | A1* | 1/2025 | Koch | H02K 5/10 |

FOREIGN PATENT DOCUMENTS

| | | | | | |
|---|---|---|---|---|---|
| CN | 110858744 | A | * | 3/2020 | H02K 9/19 |
| CN | 211508749 | U | * | 9/2020 | |
| CN | 112491181 | A | * | 3/2021 | H02K 9/06 |
| CN | 213072233 | U | * | 4/2021 | |
| CN | 216086347 | U | * | 3/2022 | |
| CN | 117543893 | A | * | 2/2024 | H02K 9/06 |
| CN | 119519306 | A | * | 2/2025 | H02K 11/30 |
| CN | 120979075 | A | * | 11/2025 | H02K 1/2798 |
| CN | 223729604 | U | * | 12/2025 | |
| DE | 4404791 | C1 | * | 3/1995 | H02K 7/18 |
| DE | 19629346 | A1 | * | 1/1998 | B60K 6/54 |
| DE | 102009001387 | A1 | * | 9/2010 | B60L 3/0061 |
| DE | 10 2016 116 033 | A1 | | 3/2017 | |
| EP | 3091637 | A1 | * | 11/2016 | H02K 5/203 |
| EP | 3091638 | A1 | * | 11/2016 | H02K 5/20 |
| EP | 3 091 638 | B1 | | 10/2019 | |
| EP | 3661027 | A1 | * | 6/2020 | H02K 5/203 |
| JP | S6344662 | U | * | 3/1988 | |
| JP | S63234856 | A | * | 9/1988 | |
| JP | 2000083351 | A | * | 3/2000 | |
| JP | 2001037160 | A | * | 2/2001 | |
| JP | 2007143247 | A | * | 6/2007 | H02K 5/203 |
| JP | 4989330 | B2 | * | 8/2012 | |
| KR | 20060053625 | A | * | 5/2006 | H02K 21/22 |
| KR | 20070008170 | A | * | 1/2007 | H02K 1/2791 |
| KR | 101072462 | B1 | * | 10/2011 | H02K 21/22 |
| KR | 20120049836 | A | * | 5/2012 | H02K 7/14 |
| WO | WO 2020/127379 | A1 | | 6/2020 | |

* cited by examiner

ELECTRIC MOTOR

RELATED APPLICATIONS

This application claims priority to DE 10 2023 119 360.0, filed Jul. 21, 2023, the entire disclosure of which is hereby incorporated herein by reference.

BACKGROUND

This disclosure relates to an external rotor motor with an internally cooled stator, and is based on an electric motor of the type generally known, for example, from EP 3 091 638 B1.

External rotor motors with an internally cooled stator, that is to say, a cooling channel that runs through an internal space surrounded by the stator, enable a high performance in combination with a compact design.

SUMMARY

This disclosure demonstrates a way in which an electric motor of the aforementioned type can be produced with less effort.

In an electric motor in accordance with this disclosure, an insert is arranged in an interior space surrounded by the stator, which insert, together with an inner part of a housing component, defines at least one section of a cooling channel. An insert, which has recesses on its exterior surface to form sections of a cooling channel, and is then inserted into a suitable opening in a housing component, can be produced cost-effectively. In particular, the cost is lower than that of the creation of channels inside a housing component, for example, using a lost mold casting process. Moreover, the insert can be produced from a material that differs from that of the housing component, for example, from a plastic.

The housing component, which together with the insert defines sections of the cooling channel, has an inner part that protrudes into the stator, for example, into a central opening of an annular stack of stator laminations. This inner part, in turn, has an opening into which the insert is inserted. The housing component therefore bounds the cooling channel in the interior space surrounded by the stator on the radially outer face. The cooling channel can be bounded radially inwards and laterally by the insert.

An advantageous refinement of this disclosure provides that the insert is positioned in the housing component by means of a tongue-and-groove joint. In this way, the insert can be positioned in its rotational angle position relative to the housing component with little effort. The tongue of the said tongue-and-groove joint can be formed on the housing component or the insert. However, in general terms it is better to provide the tongue of the said tongue-and-groove joint on the housing, since the thickness of the wall in contact with the stator can then be reduced, and thus a better thermal coupling of the cooling channel with the stator can be achieved. The groove of the tongue-and-groove joint can extend over the entire axial length of the insert. In many cases, however, a short groove at one axial end of the insert is sufficient.

Another advantageous refinement of this disclosure envisages that the insert surrounds an annular space, in which one end of the shaft is arranged. Advantageously, the cooling channel thus defined by the insert and housing component can also be used to cool a bearing of the shaft arranged in the annular space.

Another advantageous refinement of this disclosure provides that the insert has a rib running in the axial direction, along which runs the cooling channel. In this way, the mechanical stability of the insert can advantageously be increased.

Another advantageous refinement of this disclosure provides that the insert is covered by a cooling plate, along the lower face of which runs the cooling channel, and against the upper face of which abuts an electronic component of the control electronics. In this way, the cooling channel can advantageously also be used to cool one or more electronic components, such as power transistors, with which the power supply of stator windings is switched. Such a cooling plate can have protuberances on its lower face that protrude into the cooling channel. The cooling channel can run along the lower face of the cooling plate in the direction of flow, before it leads into the interior space surrounded by the stator, or vice versa, that is to say, a cooling channel section on the lower face of the cooling plate is located downstream of a cooling channel section in the interior space surrounded by the stator.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
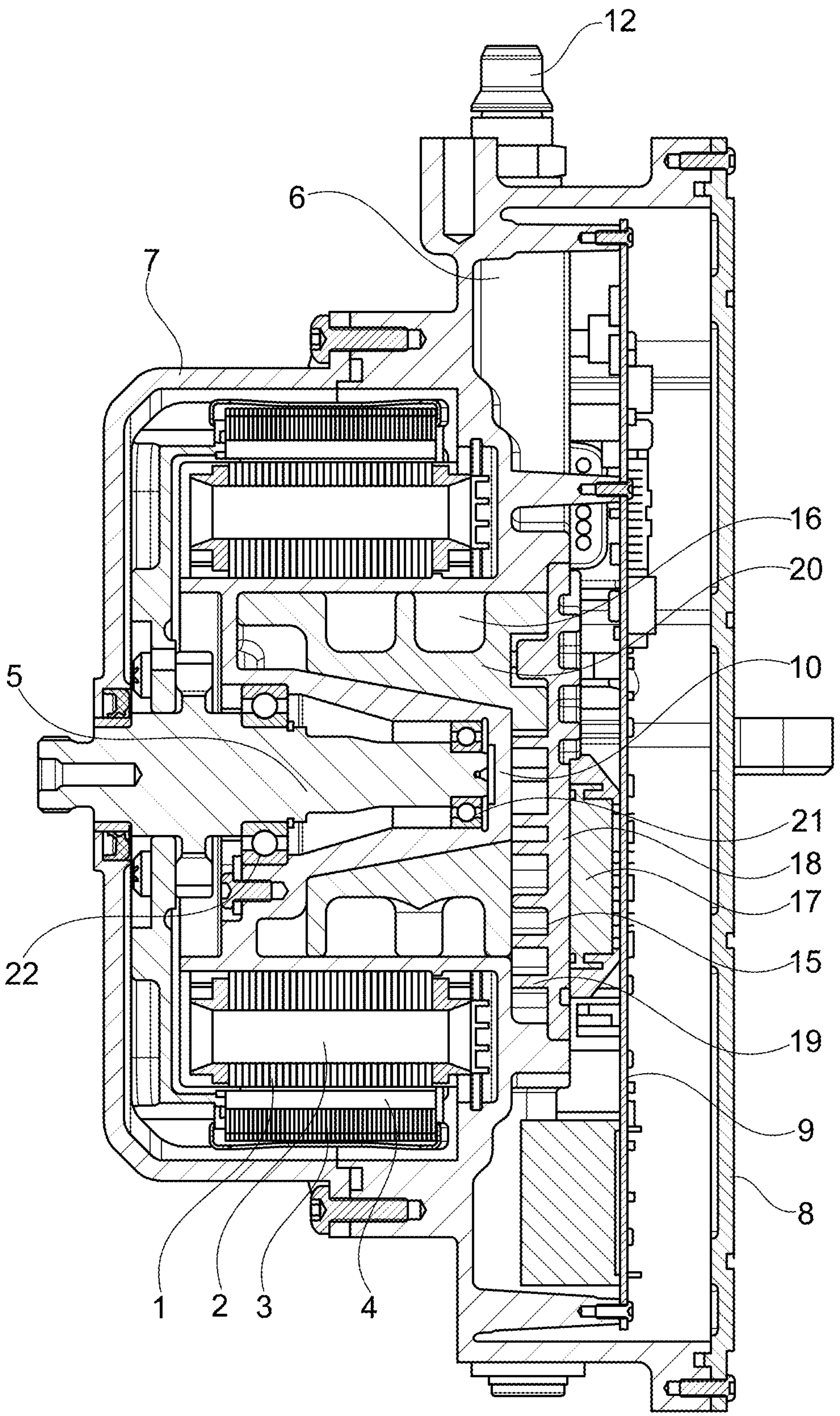
FIG. 1 shows a cross-sectional view of an example of embodiment of an electric motor in accordance with this disclosure.

The electric motor shown in FIG. 1 comprises a stator 1 with stator windings 2, a rotor 3 with permanent magnets 4, and a shaft 5 connected to the rotor 3 in a rotationally fixed manner, for example, by means of a screwed form of connection, or welding. Rotor 3 and stator 1 are enclosed in a motor compartment, which is defined by a first housing component 6 and a second housing component 7. The second housing component 7 has an opening from which the shaft 5 protrudes.

Together with a third housing component 8, the first housing component 6 defines an electronics compartment, in which is arranged a circuit board 9 with control electronics. The motor compartment and the electronics compartment are separated from each other by a wall 10 of the first housing component 6. The printed circuit board 9 faces the said wall 10, that is to say, is orientated essentially at right angles to the longitudinal axis of the shaft 5. The motor compartment and the electronics compartment are sealed from each other. Electrical cables, which connect the stator windings 2 to the printed circuit board 9 of the control electronics, are routed through sealed openings in the wall 10 of the first housing component 6.

The first housing component 6 has an inlet 11 and an outlet 12 for coolant. A cooling channel, which leads from the inlet 11 to the outlet 12, has a channel section 15 for purposes of cooling an electronic component 17 of the control electronics, and a channel section 16 for purposes of cooling the stator 1. The channel sections 15, 16 are connected in series. In the example of embodiment shown, the cooling channel section 15 for purposes of cooling the electronic component 17 is arranged upstream of the channel section 16 for purposes of cooling the stator 1. However, it is also possible for the flow to pass through the cooling channel section 15 only after the flow passes through the cooling channel section 16.

The cooling channel section 16 for purposes of cooling the stator 1 runs in an interior space surrounded by the stator 1. This cooling channel section 16 is therefore also bounded by the wall 10, which separates the motor compartment from the electronics compartment. In the example of embodiment shown, the wall 10 forms an annular space surrounded by the stator 1, into which an insert 20 is inserted, which, together with the wall 10, defines the cooling channel section 16.

The first housing component 6 carries a cooling plate 18, along the lower face of which coolant flows when in operation. For example, the cooling plate 18 together with the wall 10, which separates the engine compartment from the electronics compartment, can define a start and an end section of the cooling channel, in particular also the cooling channel section 15 for purposes of cooling the electronic component 17 of the control electronics. One or a plurality of electronic components 17 of the control electronics abut against the upper face of the cooling plate 18. To improve heat dissipation, the cooling plate 18 can have protuberances 19 on its lower face, which protrude into the cooling channel section 15.

Figure 2:
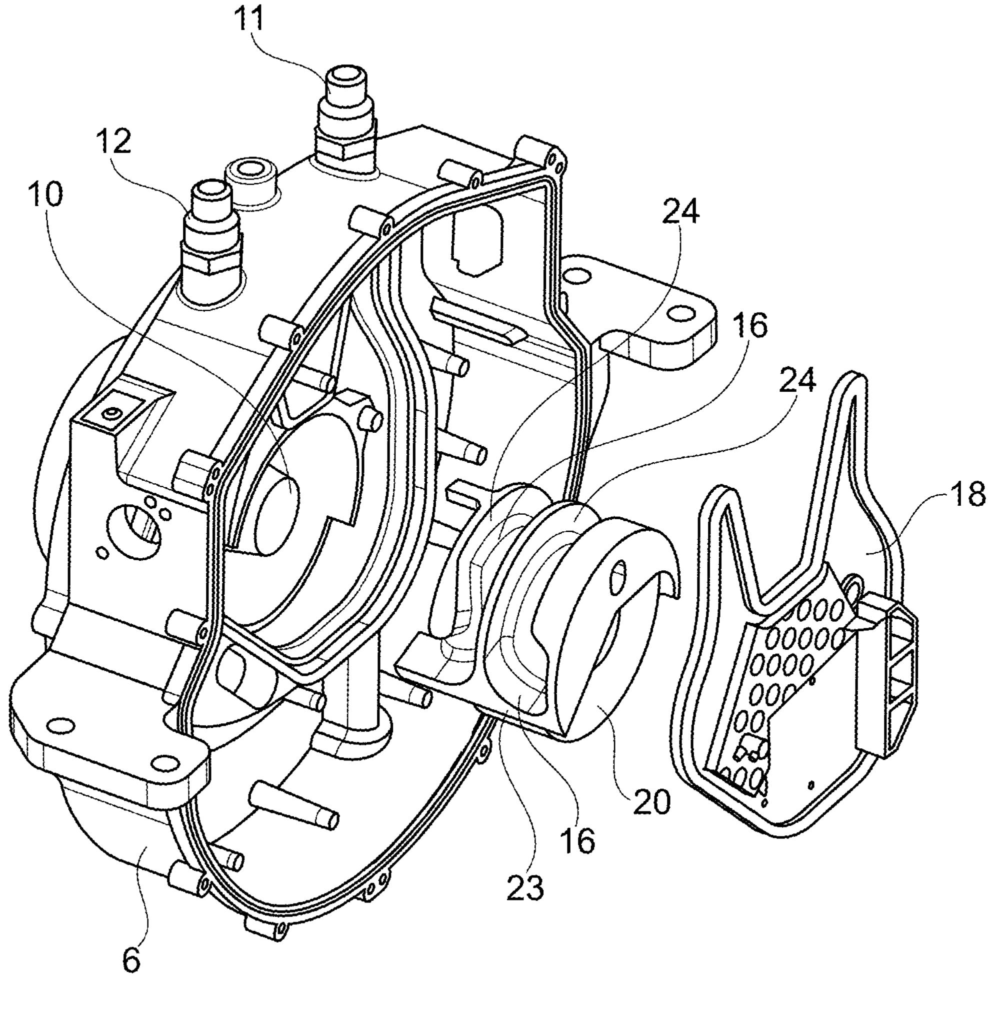
FIG. 2 shows three parts defining the cooling channel of the electric motor.

FIG. 2 shows three components, which together define the cooling channel, namely the first housing component 6, the insert 20, and the cooling plate 18. The first housing component 6 has an inner part, which protrudes into the stator 1 and forms a reception space for the insert 20. In the example of embodiment shown, this reception space is an annular space that surrounds an end section of the shaft 5 and bearings 21, 22 of the shaft 5.

The insert 20 can be positioned in the first housing component 6 by means of a tongue-and-groove joint, for example. The insert 20 has a rib 23 running in the axial direction, along which rib the cooling channel leads. This axial rib 23 has the effect of stiffening the insert, and extends over the entire axial length of the insert 20.

In the example of embodiment shown, the insert 20 has a plurality of ribs 24 running in the circumferential direction, along which ribs the cooling channel leads. Between these ribs 24, which are arranged parallel to one another, cooling channel sections run in the circumferential direction, which sections are arranged one behind the other in the direction of flow. The cooling channel therefore extends without branches in the interior space.

The insert 20 shown in FIG. 2 defines two subsections of the cooling channel section 16 running in the circumferential direction, which are connected in series. The number and shape of the subsections of the cooling channel section 16 can vary.

Figure 3:
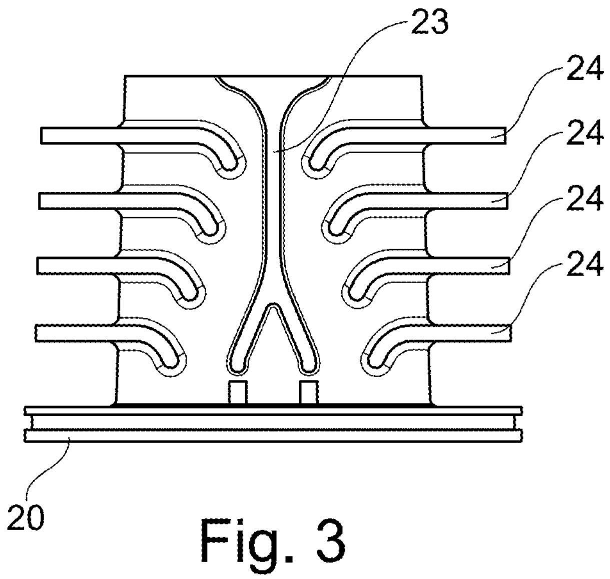
FIG. 3 shows a schematic representation of another example of embodiment of an insert forming the design of the cooling channel in the interior space surrounded by the stator.

FIG. 3 shows a schematic representation of another example of embodiment of an insert 20 forming the design of the cooling channel section 16 for purposes of stator cooling. In this example of embodiment, the cooling channel section for purposes of stator cooling branches into a plurality of subsections connected in parallel; these are defined by ribs 24 running parallel to each other in the circumferential direction. A rib 23 running in the axial direction over the entire axial length of the insert 20 mechanically stabilises the insert 20, and separates the starts and ends of the subsections from one another.

Figure 4:
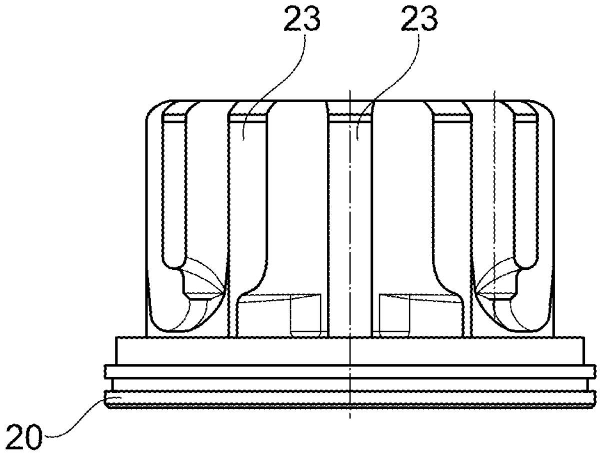
FIG. 4 shows a schematic representation of another example of embodiment of an insert forming the design of the cooling channel in the interior space surrounded by the stator.

FIG. 4 shows a schematic representation of another example of embodiment of an insert 20 forming the design of the cooling channel section 16 for purposes of stator cooling. In this example of embodiment, the insert has a plurality of ribs 23 running in the axial direction, between each of which, subsections of the cooling channel run in the axial direction. These subsections are connected in series; the cooling channel therefore has no branches.

Figure 5:
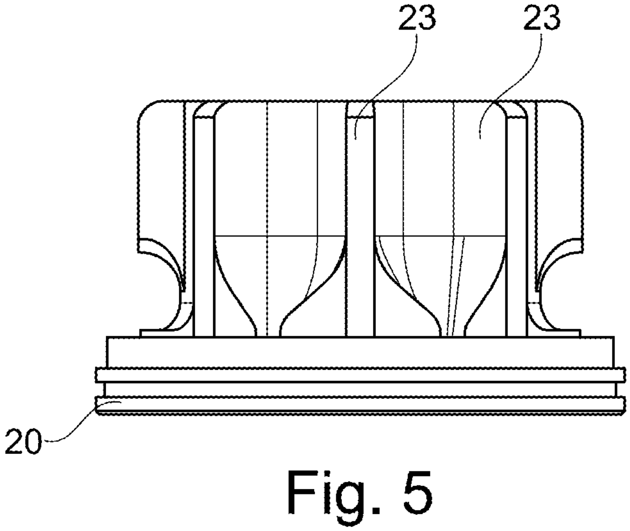
FIG. 5 shows a schematic representation of another example of embodiment of an insert forming the design of the cooling channel in the interior space surrounded by the stator.

FIG. 5 shows a schematic representation of another example of embodiment of an insert 20 forming the design of the cooling channel section 16 for purposes of stator cooling. In a similar manner to the example of embodiment of FIG. 4, the insert has a plurality of ribs 23 extending in the axial direction, between each of which, subsections of the cooling channel extend in the axial direction. The cross-section of the subsections varies in this example of embodiment. The subsections running in the axial direction narrow towards one of their two axial ends.

Figure 6:
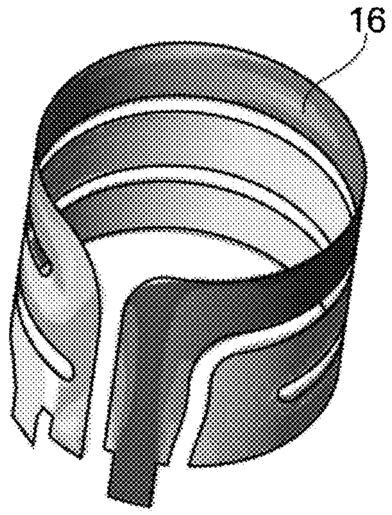
FIG. 6 shows a schematic representation of an example of the development of the cooling channel in the interior space surrounded by the stator.

FIG. 6 shows schematically an example of the development of the cooling channel section 16. The cooling channel section 16 has no branches, but has three subsections that run parallel to each other in the circumferential direction.

Figure 7:
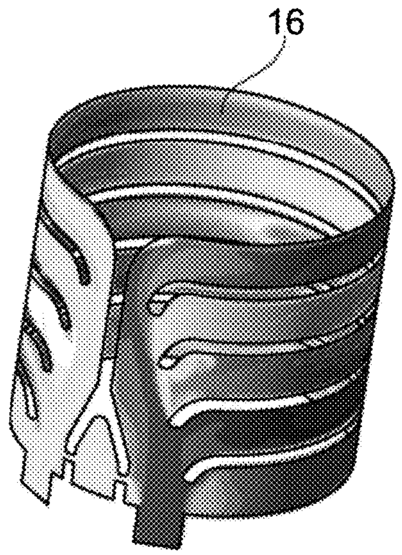
FIG. 7 shows a schematic representation of another example of the development of the cooling channel in the interior space surrounded by the stator.
Figure 8:
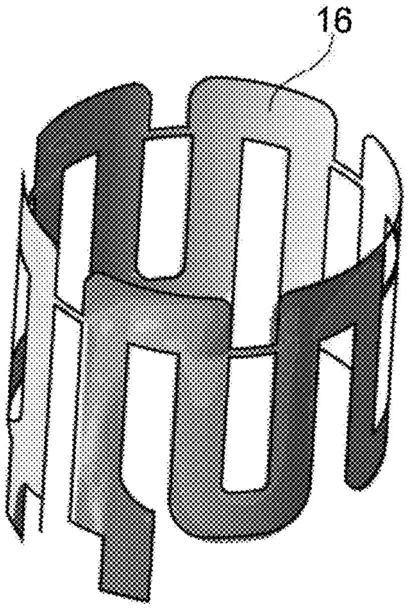
FIG. 8 shows a schematic representation of another example of the development of the cooling channel in the interior space surrounded by the stator.
Figure 9:
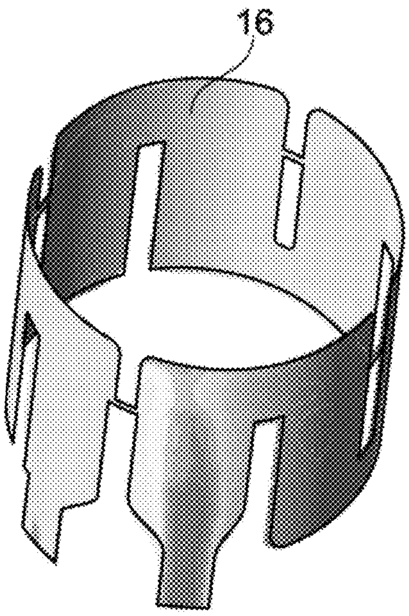
FIG. 9 shows a schematic representation of another example of the development of the cooling channel in the interior space surrounded by the stator.

FIG. 7 shows schematically the course of the cooling channel section 16 relative to the insert 20 shown in FIG. 3. FIG. 8 schematically shows the development of the cooling channel section 16 relative to the insert 20 shown in FIG. 4. FIG. 9 schematically shows the development of the cooling channel section 16 relative to the insert 20 shown in FIG. 5.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Stator
2 Stator windings

3 Rotor
4 Permanent magnets
5 Shaft
6 Housing component
7 Housing component
8 Housing component
9 Circuit board
10 Wall
11 Inlet
12 Outlet
15 Channel section
16 Cooling channel section
17 Electronic component
18 Cooling plate
19 Protuberances
20 Insert
21 Bearing
22 Bearing
23 Rib
24 Rib

What is claimed is:

1. An electric motor, comprising:
a stator;
a rotor surrounding the stator;
a shaft connected to the rotor in a rotationally fixed manner;
a housing having a first housing component and a second housing component that together enclose a motor compartment in which the stator and the rotor are arranged;
a cooling channel running in an interior space surrounded by the stator;
a first end of the shaft arranged in the motor compartment and a second end of the shaft protruding from the housing;
the first housing component comprising an inner part that protrudes into the stator; and
an insert arranged in the interior space surrounded by the stator, the insert, together with the inner part of the first housing component, defining at least one section of the cooling channel.

2. The electric motor in accordance with claim 1, wherein the insert is positioned in the first housing component by a tongue-and-groove joint.

3. The electric motor in accordance with claim 1, wherein the insert has a groove extending in the axial direction, into which a tongue of the inner part of the first housing component engages.

4. The electric motor in accordance with claim 1, wherein the insert has a rib running in the axial direction, along which the cooling channel runs.

5. The electric motor in accordance with claim 4, wherein the rib running in the axial direction extends in the axial direction over the entire length of the insert.

6. The electric motor in accordance with claim 1, wherein the insert has at least one rib extending in the circumferential direction, along which the cooling channel runs.

7. The electric motor in accordance with claim 1, wherein the insert has a plurality of ribs arranged next to one another, between which run subsections of the cooling channel.

8. The electric motor in accordance with claim 7, wherein the subsections of the cooling channel are arranged one behind the other in the direction of flow.

9. The electric motor in accordance with claim 7, wherein the subsections of the cooling channel in the interior space extend side-by-side in the axial direction.

10. The electric motor in accordance with claim 7, wherein the cooling channel has a plurality of subsections connected in series, which in the interior space extend side-by-side in the circumferential direction.

11. The electric motor in accordance with claim 1, wherein the insert is covered by a cooling plate, along the lower face of which the cooling channel runs, and against the upper face of which abuts an electronic component of the control electronics.

12. The electric motor in accordance with claim 1, wherein the insert surrounds an annular space in which is arranged the first end of the shaft.

13. An electric motor, comprising:
a stator;
a rotor surrounding the stator;
a shaft connected to the rotor in a rotationally fixed manner;
a housing having a first housing component and a second housing component that together enclose a motor compartment in which the stator and the rotor are arranged;
a cooling channel running in an interior space surrounded by the stator;
a first end of the shaft arranged in the motor compartment and a second end of the shaft protruding from the housing;
the first housing component comprising an inner part that protrudes into the stator and forms an annular reception space; and
an insert arranged in the annular reception space, the insert, together with the inner part of the first housing component, defining at least one section of the cooling channel which is surrounded by the stator; and
the first end of the shaft and bearings of the shaft surrounded by the inner part of the first housing component.

* * * * *